United States Patent [19]

Sato

[11] Patent Number: 5,260,587
[45] Date of Patent: Nov. 9, 1993

[54] OPTICAL SEMICONDUCTOR DEVICE ARRAY MODULE WITH LIGHT SHIELDING PLATE

[75] Inventor: Kazuyoshi Sato, Tokyo, Japan

[73] Assignee: Nec Corporation, Tokyo, Japan

[21] Appl. No.: 859,872

[22] Filed: Mar. 30, 1992

[30] Foreign Application Priority Data

Mar. 29, 1991 [JP] Japan ................... 3-89364

[51] Int. Cl.⁵ ........................................ H01L 33/00
[52] U.S. Cl. ............................ 257/88; 257/91; 257/98; 257/99; 257/82; 385/49; 372/50
[58] Field of Search ............... 257/82, 432, 435, 434, 257/433, 98, 99, 88, 91, 436; 385/73, 49, 92, 93, 74; 372/50, 6

[56] References Cited

U.S. PATENT DOCUMENTS

| | | | |
|---|---|---|---|
| 3,946,417 | 3/1976 | Jacobus, Jr. et al. | 257/91 |
| 4,728,999 | 3/1988 | Dannah et al. | 257/98 X |
| 4,830,453 | 5/1989 | Khoe | 350/96.18 |
| 5,093,879 | 3/1992 | Bregman et al. | 385/49 X |

FOREIGN PATENT DOCUMENTS 56-156801 12/1981 Japan.
56-167115 12/1981 Japan.

*Primary Examiner*—William Mintel
*Attorney, Agent, or Firm*—Foley & Lardner

[57] ABSTRACT

An array of optical semiconductor devices, an array of lenses and an array of optical fibers are serially arranged in light propagation direction to provide a light axis alignment. At light input ends of the optical fibers, a light shielding plate is positioned. The light shielding plate is provided with light apertures corresponding to light input facets of the optical fibers to decrease leakage light interference between adjacent optical fibers.

7 Claims, 4 Drawing Sheets

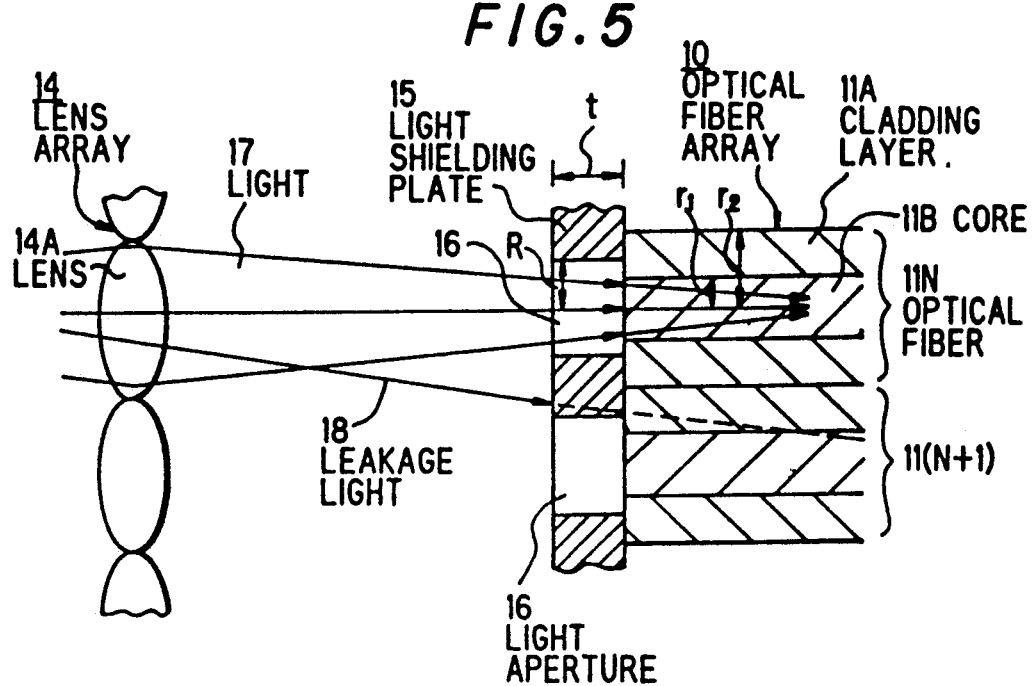
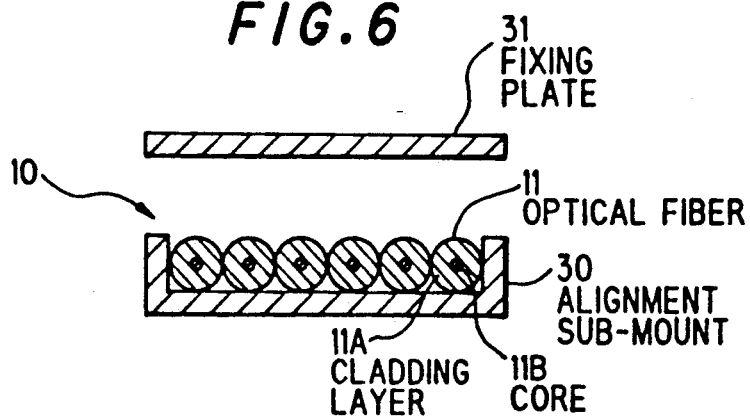
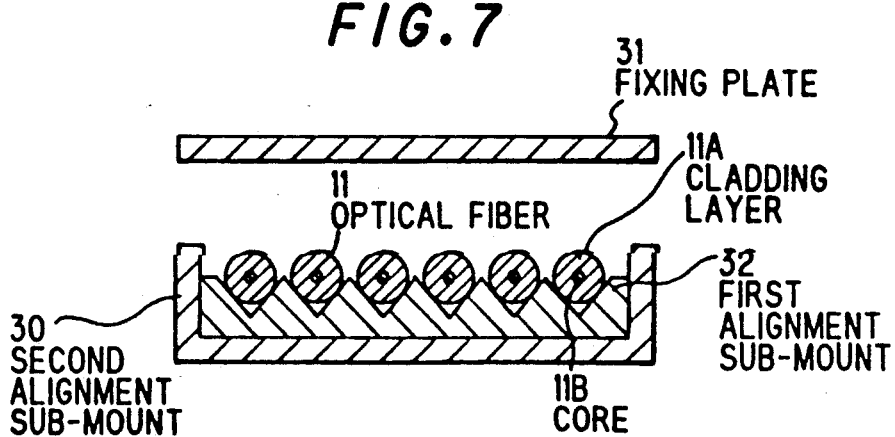

OPTICAL SEMICONDUCTOR DEVICE ARRAY MODULE WITH LIGHT SHIELDING PLATE

FIELD OF THE INVENTION

This invention relates to an optical semiconductor device array module, and more particularly to, an optical semiconductor device array module used for a light source of emitting light signals for an optical parallel transmission.

BACKGROUND OF THE INVENTION

An optical parallel transmission system is expected to be widely applied to a computer interface, because the optical parallel transmission is advantageous in transmission speed, transmission distance, and anti-electromagnetic interference as compared to an electric parallel transmission system. In this optical parallel transmission system, an optical semiconductor module which is used for a light source of emitting light signals for an optical parallel transmission is required to be small in size and low in cost. For this purpose, optical semiconductor devices and optical fibers, etc. are desired to be arranged in array pattern for an optical parallel transmission.

A conventional optical semiconductor device array module used for such an optical parallel transmission comprises an LED (light emitting diode) array comprising a plurality of LEDs, an optical fiber array comprising a plurality of optical fibers, and a lens array for optical-coupling the optical fibers to the LEDs, respectively.

In operation, the LEDs are driven to emit light signals which are supplied through the lens array to input facets of the optical fibers, so that the light signals are transmitted in parallel through the optical fibers.

In the optical parallel transmission, the light signals tends to leak from one optical fiber to the adjacent optical fibers. One experiment shows that such leakage light resulting in cross-talk can be avoided to be less than 40 dB, when the adjacent optical fibers are separated in a distance between central axes thereof by more than 210 μm, where an outer diameter of the optical fibers is 125 μm (to be explained in detail later).

However, the conventional optical semiconductor device array module has a disadvantage in that it becomes large in size, especially, a width thereof becomes 1.39 mm, when six optical fibers each having an outer diameter of 125 μm are arranged in array pattern with the aforementioned separated distance of 210 μm (to be explained in detail later).

Accordingly, it is an object of the invention to provide an optical semiconductor device array module which is made small in size without occurrence of leakage light interface between adjacent optical fibers.

According to the invention, an optical semiconductor device array module, comprises:

a plurality of optical semiconductor devices arranged in array pattern with a predetermined interval or predetermined intervals in a direction perpendicular to light axes;

a plurality of lenses arranged in array pattern with the predetermined interval or intervals to focus lights emitted from the optical semiconductor devices on predetermined points;

a plurality of optical fibers arranged in array pattern with the predetermined interval or intervals to be positioned at the predetermined points by light input facets thereof and to be supplied with the lights focused by the lenses; and a light shielding plate having a plurality of light apertures positioned to face the light input facets of the optical fibers;

wherein each of the light apertures of the light shielding plate has a predetermined radius, and a central axis common to a central axis of a core of each of the optical fibers.

BRIEF DESCRIPTION OF THE DRAWINGS

The invention will be explained in more detail in conjunction with appended drawings, wherein:

FIG. 5 is an explanatory view showing a relation between a lens array and an optical fiber array in the optical semiconductor device array module of the preferred embodiment;

FIGS. 6 and 7 are cross-sectional views showing first and second structures of the optical fiber array in the optical semiconductor device array module of the preferred embodiment.

DESCRIPTION OF THE PREFERRED EMBODIMENT

Before describing an optical semiconductor device array module of a preferred embodiment according to the invention, the aforementioned conventional optical semiconductor device array module will be explained in FIGS. 1 to 3.

Figure 1:
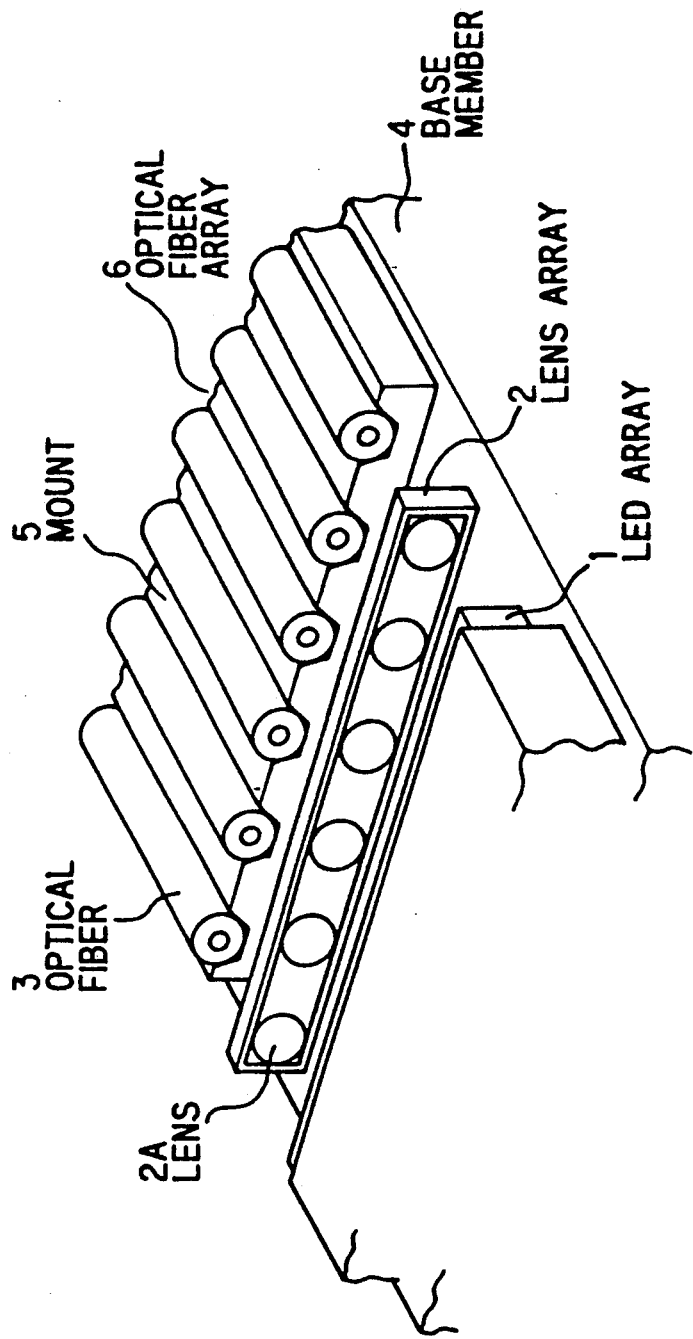
FIG. 1 is a perspective view showing a conventional semiconductor device array module.

FIG. 1 shows the conventional optical semiconductor device array module which comprises an LED array 1, a lens array 2, and an optical fiber array 6, respectively, provided on a base member 4. The LED array 1 comprises first to sixth LEDs (not shown) which are arranged in array pattern with a predetermined interval between the adjacent LEDs, and the lens array 2 comprises first to sixth lenses 2A each corresponding to one of the first to sixth LEDs. Similarly, the optical fiber array 6 comprises first to sixth optical fibers 3 each positioned in one of grooves of a mount 5 which is fixed to the base member 4. Thus, the first LED of the LED array 1 and the first optical fiber 3 of the optical fiber array 6 are optically coupled by the first lens 2A of the lens array 2, and the second to sixth LEDs of the LED array 1 are optically coupled to the second to sixth optical fibers 3 of the optical fiber array 6, respectively, by the second to sixth lenses 2A of the lens array 2.

Figure 2:
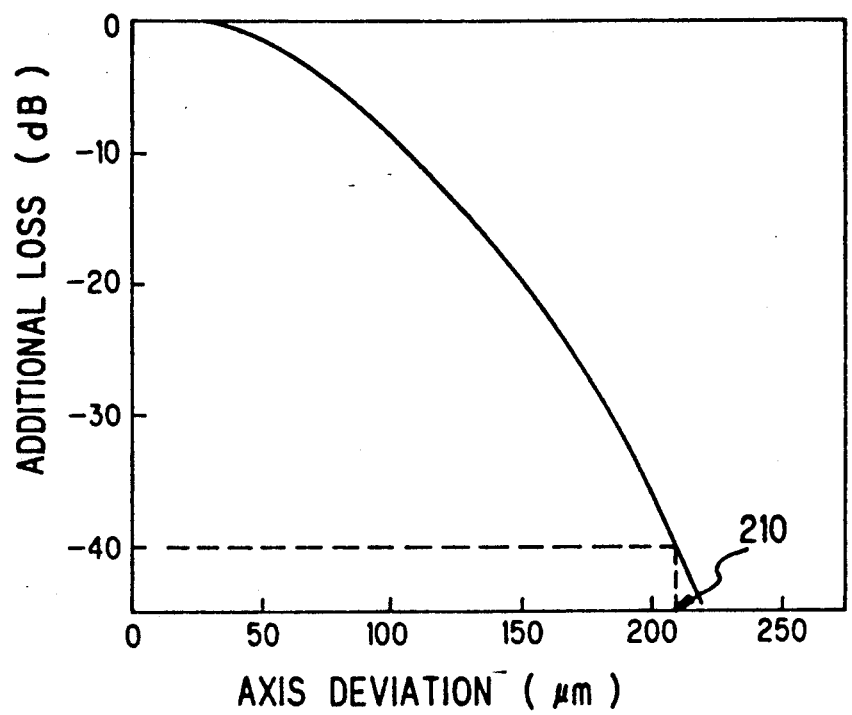
FIG. 2 is a graph explaining an additional loss caused by an axis deviation of an optical fiber in the conventional semiconductor device array module.

FIG. 2 shows that an additional loss of 40 dB occurs, when a deviation of 210 μm exists between axes of one LED of the LED array 1 and a corresponding optical fiber 3 of the optical fiber array 6. This means that an interval of the optical fibers 3 must be more than 210 μm to provide a leakage light isolation of less than 40 dB.

Figure 3:
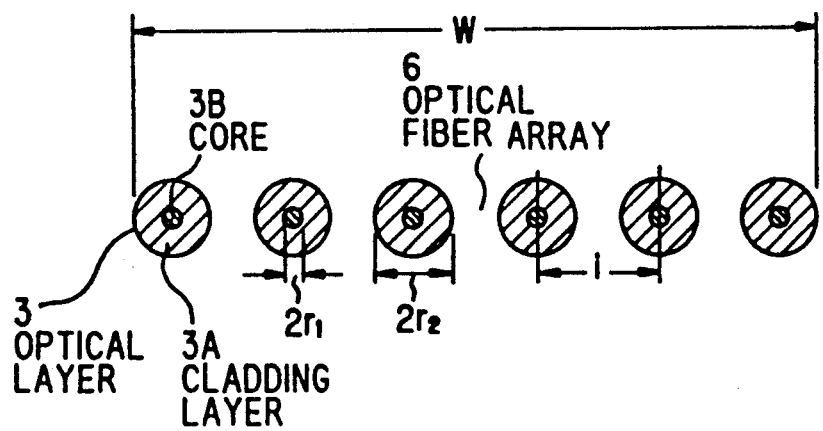
FIG. 3 is a cross-sectional view showing an optical fiber array in the conventional semiconductor device array module.

FIG. 3 shows that a width W of the optical fiber array 6 is calculated by the below equation.

$$W = 5 \times i + 2r_2 (i > 2r_2)$$

where i is an interval of the two adjacent optical fibers 3 each comprising a core 3B having a diameter of $2r_1$ (=50 μm) and a cladding layer 3A having a diameter of $2r_2$ (=125 μm) which is equal to an outer diameter of the optical fiber 3.

Here, i of 210 μm (FIG. 2) and $2r_2$ of 125 μm are inserted into the above equation, W of 1.175 mm is obtained.

On the other hand, if the six optical fibers 3 are arranged to be contact directly side by side, W of 0.75 mm is obtained by $(125 \times 6)$ μm. This means that the width of the former is approximately 1.6 times the width of the latter.

For this reason, an optical semiconductor device array module in which appropriate leakage light isolation is realized without increasing a width thereof is provided in the invention.

Figure 4:
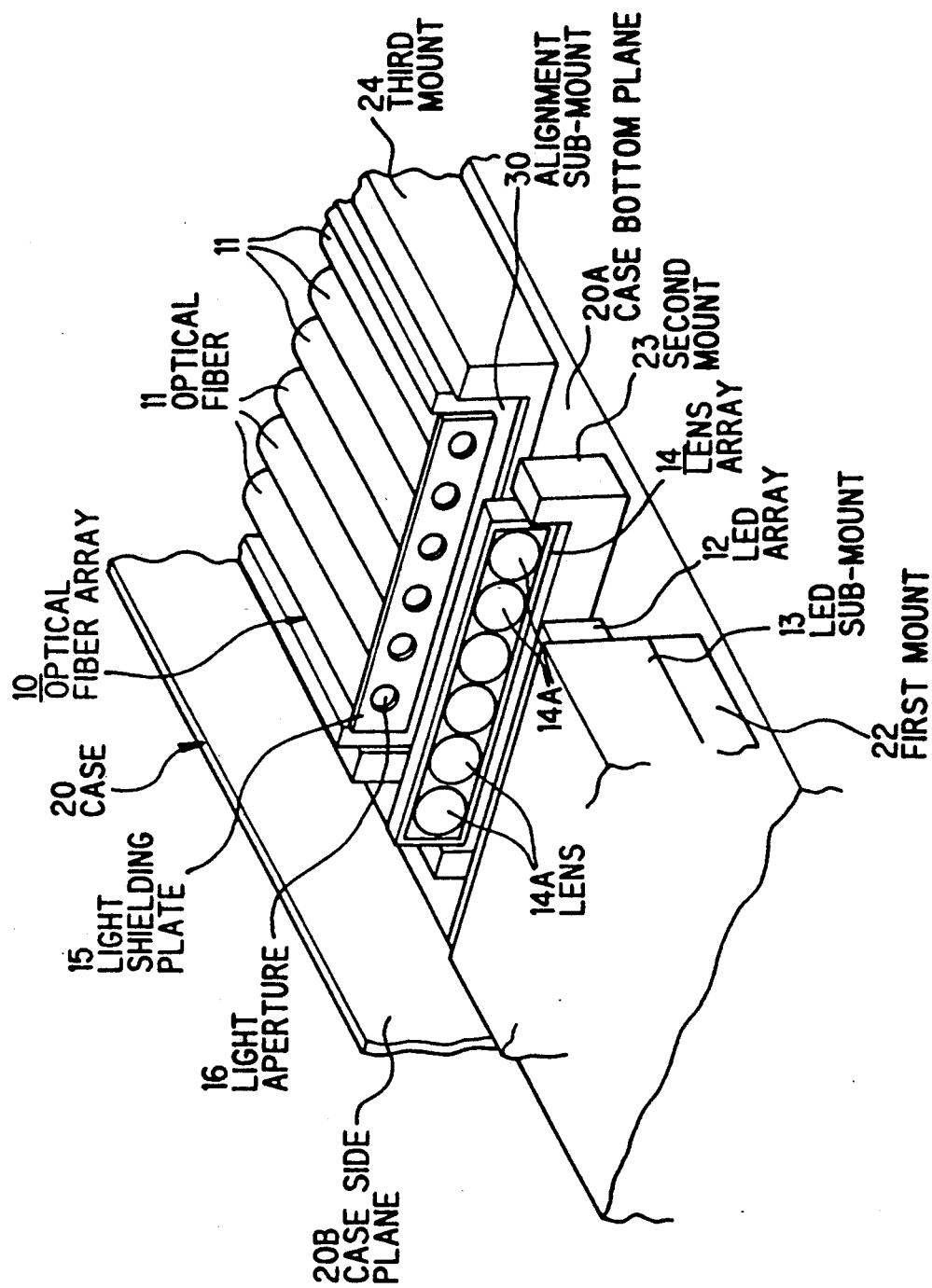
FIG. 4 is a perspective view showing an optical semiconductor device array module of a preferred embodiment according to the invention.

Next, an optical semiconductor device array module of a preferred embodiment according to the invention will be explained in FIG. 4.

The optical semiconductor device array module comprises an LED array 12 comprising first to sixth LEDs (not shown), a lens array 14 comprising first to sixth lenses 14A, and an optical fiber array 10 comprising first to sixth multi-mode optical fibers 11, which are enclosed in a case 20 having a bottom plane 20A, a side plane 20B, etc. The LED array 12 is mounted on an LED sub-mount 13 which is mounted on a first mount 22 fixed on the bottom plane 20A of the case 20. The lens array 14 is mounted on a second mount fixed on the bottom plane 20A of the case 20, and the optical fiber array 10 is mounted on an alignment sub-mount 30 which is mounted on a third mount 24 fixed on the bottom plane 20A of the case 20. As shown therein, the optical fiber array 10 is provided at input facets of the optical fibers $11_N$ (N=1~6) with a light shielding plate 15 of stainless steel having first to sixth light apertures 16 corresponding to the first to sixth lenses 14A of the lens array 14, such that the light shielding plate 15 is fixed to the optical fibers 11 by use of adhesive.

This structure is clearly shown in FIG. 5, where in the light shielding plate having a thickness of t is provided with the light apertures 16 each having a radius of R, and the input facets of the optical fibers $11_N$, $11_{N+1}$ each comprising a core 11B having a radius of $r_1$ and a cladding layer 11A having a radius of $r_2$, such that the optical fibers 11 are fixed between the alignment sub-mount 30 and a fixing plate 31 by use of adhesive, as shown in FIG. 6, to align the cores 11B of the optical fibers 11 with the light apertures 16 of the light shielding plate 15 and the lenses 14A of the lens array 14, respectively.

Here, it is assumed that the core radius $r_1$ is 50/2 μm, the cladding layer radius $r_2$ is 125/2 μm, the numerical aperture NA of the multi-mode optical fibers 11 is 0.21, and the light shielding plate thickness t is 60 μm. Consequently, the radius R of the light apertures 16 is obtained by the below equation.

$$\begin{aligned} R &= r_1 + NA \cdot t \\ &= 25 + 0.21 \times 60 \\ &= 38 \, \mu m \end{aligned}$$

As understood from the illustration of FIG. 6, an interval between the axes of the optical fibers 11 is equal to an outer diameter of the optical fibers 11 which is equal to the cladding layer diameter ($2r_2$=125 μm), so that the LEDs of the LED array 12 and the lenses 14A of the lens array 14 are arranged to have the same interval therebetween.

In this preferred embodiment, it should be noted that the first to third mounts 22 to 24 are set to have respective heights on the bottom plane 20A of the case 20, so that the LEDs of the LED array 12 are precisely optical-coupled through the lenses 14A of the lens array 14 to the optical fibers 11 of the optical fiber array 10. In addition, the alignment sub-mount 30 is slid on the third mount 24, so that a light path length is adjusted between the lens array 14 and the optical fiber array 10.

In operation, light signals emitted from the LED array 12 are supplied in respective channels to the lens array 14, so that the light signals are supplied in respective channels through the light apertures 16 of the light shielding plate 15 to the optical fibers 11 of the optical fiber array 10. As enlarged in FIG. 5, almost all of light 17 transmitted through one of the lenses 14A is passed through a corresponding channel light aperture 16 of the light shielding plate 15 to be supplied to a corresponding channel optical fiber $11_N$ of the optical fiber array 10. For this structure, leakage light 18 supplied from the lens 14A is shielded not to be supplied to an adjacent channel optical fiber $11_{N+1}$ of the optical fiber array 10 by the light shielding plate 15. As understood from this preferred embodiment, when the radius R of the light apertures 16 is met by the aforementioned equation, a predetermined level of leakage light isolation is realized, even if the interval between the axes of the optical fibers 11 is set much smaller than an interval determined in FIG. 2. Therefore, the width of the optical fiber array 10 can be small without occurrence of leakage light interference.

In this preferred embodiment, the multi-mode optical fibers 11 may be replaced by single-mode optical fibers, and the LEDs of the LED array 12, the lenses 14A of the lens array 14, the light aperture 16 of the light shielding plate 15, and the optical fibers 11 of the optical fiber array 10 may be arranged with different intervals, correspondingly. In addition, the number, the dimension etc. of the optical fibers 11 may be changed dependent on the design of the optical semiconductor device array module, and materials of other components may be changed in the same manner. The LEDs of the LED array 12 may also be replaced by other optical semiconductor devices such as semiconductor lasers.

For instance, FIG. 7 shows the optical fiber array 10 which may be structured to comprise optical fibers 11, first and second alignment sub-mounts 30 and 32, and a fixing plate 21, wherein like parts are indicated by like reference numerals as used in FIG. 6. In this structure, the first alignment sub-mount 32 is of silicon plate on which V-shaped grooves are provided by etching, so that the precisely dimensioned configuration is obtained to provide precise intervals among the optical fibers 11.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical semiconductor device array module, comprising:
   a plurality of optical semiconductor devices arranged in an array pattern with predetermined intervals in a direction perpendicular to a light axis;
   a plurality of lenses arranged in an array pattern with said predetermined intervals to focus light emitted from said optical semiconductor devices on predetermined points;
   a plurality of optical fibers arranged in an array pattern with said predetermined intervals and having light input facets positioned at said predetermined points to be supplied with said light focused by said lenses; and
   a light shielding plate having a plurality of light apertures positioned to face said light input facets of said optical fibers;
   wherein each of said light apertures of said light shielding plate has a predetermined radius, and a central axis common to a central axis of a core of each of said optical fibers.

2. An optical semiconductor device array module, according to claim 1, wherein:
   said light shielding plate is in contact with light input ends of said optical fibers; and
   each of said light apertures meets an equation defined by $$R = r_1 + NA \cdot t$$

where R is a radius of said light apertures, $r_1$ is a radius of cores of said optical fibers, NA is a numerical aperture of said optical fibers, and t is a thickness of said light shielding plate.

3. An optical semiconductor device array module, according to claim 1, wherein:
   said light shielding plate is of stainless steel.

4. An optical semiconductor device array module, according to claim 1, further comprising:
   a first mount for mounting said optical semiconductor devices thereon;
   a second mount for mounting said lenses thereon; and
   a third mount for mounting said optical fibers and said light shielding plate thereon;
   wherein said first to third mounts are mounted on a bottom plane of a case member.

5. An optical semiconductor device array module, according to claim 4, further comprising:
   an alignment sub-mount for mounting said optical fibers and said light shielding plate thereon; wherein
   said alignment sub-mount is provided on said third mount to be slid thereon, so that a light path length is adjusted between an array of said lenses and an array of said optical fibers.

6. A method of operating an optical semiconductor array module comprising the steps of:
   providing at predetermined intervals a plurality of optical semiconductor devices each capable of emitting light;
   placing a plurality of lenses at said predetermined intervals such that each of said plurality of lenses are in an optical path of light emitted from a corresponding one of said plurality of optical semiconductor devices;
   focusing, via said plurality of lenses, said light emitted from said plurality of optical semiconductor devices at a plurality of predetermined points, each of said plurality of predetermined points corresponding to one of said plurality of lenses;
   mounting a plurality of optical fibers spaced at said predetermined intervals such that light input facets of each of said plurality of optical fibers correspond to one of said plurality of predetermined points for receiving light focused by said corresponding lens;
   positioning a light shielding plate having a plurality of light apertures each corresponding to one of said plurality of optical fibers, each of said plurality of light apertures having a predetermined aperture radius, between said plurality of lenses and said plurality of optical fibers such that said light shielding plate operates to prevent light focused by a lens at a predetermined point not corresponding to a particular optical fiber from entering into said particular optical fiber.

7. A method of operating an optical semiconductor array module as recited in claim 6 further comprising the step of calculating said predetermined aperture radius for each of said plurality of light apertures according to an equation defined by:

$$R = f_1 + NA \times t$$

where R is said calculated predetermined aperture radius, $r_1$ is a core radius of said optical fiber corresponding to said light aperture, NA is a numerical aperture of said optical fiber and t is a thickness of said light shielding plate.

* * * * *